United States Patent [19]

Hoffmann et al.

[11] Patent Number: 4,543,184
[45] Date of Patent: Sep. 24, 1985

[54] CAKE FILTRATION APPARATUS

[75] Inventors: Karl Hoffmann, Bad Kreuznach; Dieter Krulitsch, Bad Münster am Stein; Helmut Schwartz, Bad Kreuznach, all of Fed. Rep. of Germany

[73] Assignee: Seitz Enzinger Noll Maschinenbau Aktiengesellschaft, Mannheim, Fed. Rep. of Germany

[21] Appl. No.: 606,273

[22] Filed: May 2, 1984

[30] Foreign Application Priority Data

May 2, 1983 [DE] Fed. Rep. of Germany ....... 3315898

[51] Int. Cl.⁴ ............................................. B01N 29/02
[52] U.S. Cl. .................................... 210/193; 210/330; 210/345
[58] Field of Search ................... 210/193, 323.1, 323.2, 210/330, 325, 345

[56] References Cited

U.S. PATENT DOCUMENTS

| 3,662,894 | 5/1972 | Bocklea | 210/330 |
| 3,693,803 | 9/1972 | Guazzone | 210/330 |
| 3,948,778 | 4/1976 | Mullei | 210/330 |
| 3,957,636 | 5/1976 | Arvanitakis | 210/193 |

Primary Examiner—John Adee
Attorney, Agent, or Firm—Becker & Becker, Inc.

[57] ABSTRACT

A cake filtration apparatus in a structural unit which comprises a plate filter and a filtering aid-dosing device which includes an agitator. The drive parts for rotating the filter unit are disposed on the top wall of the filter housing, and are connected with the drive of the agitator by means of a transmission device and a freewheel coupling. The shaft of the filter unit is only sealingly and rotatably mounted in the vicinity of the bottom of the housing. The bottom plate, the height of which is adjustable for removal of the centrifuged filter cake, is constructed in the manner of a disk valve having a valve seat, and can be raised and lowered independently of the filter unit, so that for centrifuging and removal of the filter cake, the filter unit no longer has to be raised or in some other manner moved out of its operating position. The control mechanism for raising and lowering the bottom plate is self-locking, so that the surface of the bottom plate can be pulled at desired pressure onto the valve seat formed on the bottom ring; as a result, a reliable sealing of the bottom is already assured at the start of the cake filtration process.

19 Claims, 2 Drawing Figures

CAKE FILTRATION APPARATUS

BACKGROUND OF THE INVENTION

The present invention relates to a cake filtration apparatus in a structural unit which comprises a plate filter, a filtering aid-dosing device which is provided with an agitator, and a pump, lines, and valves for supplying the slurry which is to be filtered and for withdrawing the filtrate; the plate filter includes a filter unit within a housing. The filter unit is formed by a stack of filter plates which are disposed on a shaft, and can be rotated about its vertically disposed central axis for centrifuging the filter cake. The housing supports at least a portion of the drive mechanism for rotating the filter unit, and is provided with connections for supplying the slurry and for withdrawing the filtrate. The housing is provided with a housing bottom and a tank or hood-like housing part which is secured thereon and contains the peripheral wall and the top wall. The housing bottom includes a bottom plate which is disposed within a stationary bottom ring. The bottom plate can be raised from a lower closed position, in which it is sealed relative to the bottom ring, into an open position for removal of the centrifuged filter cake.

Pursuant to one known cake filtration apparatus of the aforementioned general type (compare company publication "FILTER-O-MAT 65" of the firm Filtrox-Werk AG, St. Gallen; No. 119 4880), the operation for rotating the filter unit is effected from the bottom of the filter housing. The connections for supplying the slurry and for withdrawing the filtrate are located on the upper portion of the filter housing. To raise the bottom plate for the removal of the centrifuged filter cake, the entire filter unit, along with the bottom plate disposed on the bottom side thereof, are raised from the upper side of the filter housing by means of a spindle. This means that every time the plate filter is to be cleaned, an attendant must first climb onto the top of the plate filter housing, must undertake opening of the bottom plate at the same time that the filter unit is raised, and after conclusion of the cleaning process must again climb onto the housing of the plate filter and manually undertake lowering of the filter unit. This significantly complicates operation and servicing of the apparatus. In addition, with these tasks there exists periods of danger which cannot be overlooked. Furthermore, the necessity for raising the filter unit together with the bottom plate entails considerable structural expense. Finally, it is necessary with the heretofore known apparatuses, after the filter unit has been raised and the bottom plate has been opened, to engage a coupling provided between the drive motor for the slurry pump and the drive for rotating the filter unit. Aside from the fact that this represents an additional operation, the energy requirement for operation of the slurry pump and for drive of the filter unit for rotation is so different that the drive motor for the slurry pump must be unnecessarily large.

It is therefore an object of the present invention to substantially improve a cake filtration apparatus of the aforementioned general type, so that serviceability is improved, sources of danger during servicing of the apparatus are eliminated, and structural expense is significantly reduced.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
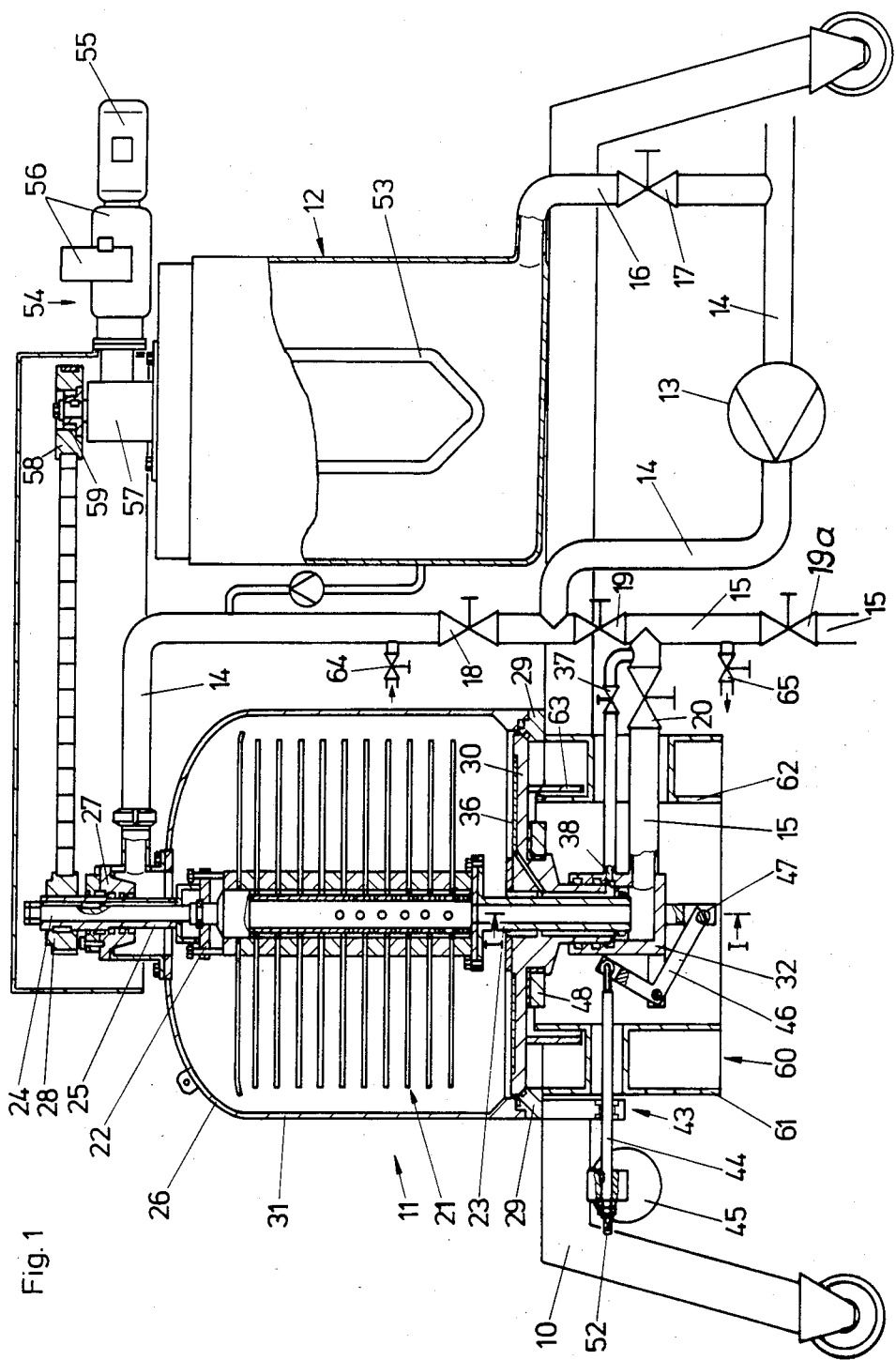
FIG. 1 is a partially vertically sectioned side view of one embodiment of the inventive cake filtration apparatus, with the bottom plate being lowered.

The cake filtration apparatus of the present invention is characterized primarily in that those parts of the drive mechanism arranged on the housing of the plate filter are disposed on the top wall for axial support and for rotation of the shaft of the filter unit, and are driven via an automatically shiftable coupling from the drive of the agitator of the dosing device; in the region of the housing bottom, the shaft of the filter unit is only rotatably sealingly mounted, and the bottom plate, in the manner of a disk valve having a valve seat in the bottom ring for opening and closing, can be raised and lowered, independently of the filter unit, by means of a control mechanism.

Pursuant to the present invention, the filter unit remains in position when the bottom plate is raised; as a result, the weight which is to be raised is considerably reduced. Furthermore, the operator or attendant no longer has to climb onto the apparatus. The coupling in the drive for the rotation of the filter unit is now automatically shiftable. Thus, on the whole, servicing of the apparatus is considerably simpler, and above all is not dangerous. Raising the bottom plate independently of the filter unit offers the advantage that the bottom plate can also be opened for other purposes, such as for discharging the filter cake, steaming, etc. Since the filter unit does not have to carry out any vertical movements when the bottom plate is raised and lowered, the support devices at the top and bottom of the shaft of the filter unit can be in the form of mere rotary bearings, thus achieving a further reduction of the structural expense.

Pursuant to a particularly advantageous embodiment of the present invention, the raisable and lowerable bottom plate can be sealingly yet axially displaceably guided on the shaft of the filter unit by means of a downwardly directed, hollow-shaft-like extension, and can be sealingly, rotatably, and axially displaceably guided in a stationary, sleeve-like support and connecting piece. As a result, the bottom plate carries out the same rotary movement as does the filter unit. A particular coupling can be provided between the filter unit and the bottom plate by making it an operative rotation coupling having a coupling through pin and a driving disk for guiding the latter.

Pursuant to a further particularly advantageous embodiment of the present invention, a residual filtration element may be provided on top of the bottom plate; the filtrate from this element is conducted through channels in the bottom plate, in the extension of the bottom plate, and in the support and connecting piece, as well as through an additional shut-off valve, to the filtrate withdrawal line. This residual filtration arrangement offers particular advantages because on the one hand it enables a practically complete residual filtration, and on the other hand makes possible the unproblematic and complete withdrawal of the residual filtrate from below. Rotating the bottom plate together with the filter unit during discharge of the filter cake assures that the filter cake of the residual filtration element, which is formed on the bottom plate, will also be completely centrifuged. Furthermore, the arrangement of the residual filtration element on top of the bottom plate, and the withdrawal of the residual filtrate through channels in the bottom plate and in the extension of the bottom plate, furthermore offer a particular possibility for backwashing the residual filtration element. This possibility can be realized by providing between the connection of the filtrate withdrawal line and the channels of the extension of the bottom plate, and on this extension and in the support and connecting piece, cooperating parts of a backwash valve which is closed when the bottom plate is lowered and is open when the bottom plate is raised.

Pursuant to a further advantageous embodiment of the present invention, the control mechanism for raising and lowering the bottom plate includes a screw drive. As a result of such a screw drive, not only can the bottom plate remain in any desired raised position, but it can also be pulled into its closure position with any desired force, and can thus be pulled into tight and sealing engagement with the valve seat formed in the bottom ring. This means that the bottom plate, in contrast to heretofore known apparatuses of this type, is already placed during closing in a completely effective sealing position, and the filter housing is already reliably sealed during filling, even without building up an internal pressure. The screw drive can preferably be provided with a drive motor which is self-locking in any position.

The bottom ring of the filter housing offers the particular advantage of a rigid, reliable structure which not only offers reliable support for that portion of the housing which includes the peripheral wall and the top wall, but it also is suitable for having placed thereon the support and connecting piece for lower support and sealing of the shaft of the filter unit, and the control mechanism for raising and lowering the bottom plate.

The tank or hood-like housing portion may be mounted on the bottom ring in such a way that it can be raised therefrom.

Preferably, in order to raise and lower the bottom plate, the control mechanism is provided with guide bars which are vertically displaceably disposed in extensions on the support and connecting piece; a support and bearing ring is supported on the guide bars and is mounted on the underside of the bottom plate on the extension thereof.

For advantageous operation, the screw spindle of the screw drive of the control mechanism is preferably disposed substantially horizontally and is pivotably connected to the guide bars via an angle lever.

Pursuant to a preferred embodiment of the present invention, the driving direction of rotation of the drive mechanism of the agitator can be made reversible, and the automatically shiftable coupling, which is disposed ahead of the drive location for rotating the shaft of the filter unit, is a freewheel or slip coupling which, for agitator operation in the normal direction of rotation, is designed for freewheeling, and for rotating the filter unit in the opposite direction of rotation, is designed for locking-in and driving.

The drive mechanism of the agitator advantageously includes a speed-regulatable drive motor and/or a speed-adjustable, preferably infinitely variable, gearing.

The drive mechanism for rotating the filter unit may be a pulley drive, and includes the drive parts disposed on the top wall of the housing, and the drive mechanism of the agitator, including the freewheel coupling, both in conjunction with a transmission means. This drive mechanism, which may be a toothed belt drive, assures elastic starting and non-slip positive drive if the freewheel coupling, which is associated with the drive mechanism of the agitator, is mounted on a shaft end of the agitator drive mechanism, with the shaft end being aligned with the shaft of the filter unit; a driving toothed belt pulley is connected with the freewheel coupling part. Furthermore, those parts of the drive mechanism disposed on the top wall of the plate filter comprise a driven toothed belt pulley, a driven sleeve, and a support and connecting head, with the driven toothed belt pulley being securely connected with the driven sleeve, which fixedly holds the shaft of the filter unit, and in turn is sealingly rotatably and in an axially supported manner mounted in the support and connecting head which is disposed on the top wall. As a result, after loosening a tensioning nut and the slurry line, as well as after removing the support and connecting head, including the driven sleeve together with the toothed belt pulley, it is possible to remove the tank or hood-like housing part from the bottom ring in order to expose the filter unit for any necessary servicing.

By advantageously constructing the driven sleeve with a counter support at the bottom end, and a support surface having a tensioning nut at the upper end, the lower end forms the counter support for an adjustable pressure device which acts axially on the stack of filter plates which forms the filter unit. To maintain the sealing position of the filter unit, the pressure of the pressure device can be externally adjusted by means of the tensioning or adjusting nut; this adjusting nut cooperates with a thread on the upper part of the shaft of the filter unit, which shaft is guided through the driven sleeve.

In order to also improve withdrawal of the filter cake externally of the filter housing, and above all to shield the support and guide parts disposed below the filter housing, and the control mechanism for raising and lowering the bottom plate, from filter cake which is dropping out, it is advisable to dispose on the bottom ring for the centrifuged filter cakes, a discharge conduit which extends all around. The discharge conduit can be formed by two coaxial, essentially cylindrical guide walls, between which is formed a discharge gap. In order to improve the effect of this discharge conduit, a discharge guide plate which extends telescopically into the discharge conduit may be disposed on the underside of the bottom plate.

DESCRIPTION OF PREFERRED EMBODIMENTS

Referring now to the drawings in detail, the structural unit of the cake filtration apparatus is expediently disposed on a movable support 10, and comprises a plate filter 11, a filter medium dosing device 12 which is equipped with an agitator, a pump 13, a slurry line 14, a filtrate withdrawal line 15, a line 16 which, via a reversing valve 17, leads from the dosing device 12 into the slurry line 14 ahead of the pump 13, as well as further reversing valves 18, 19, 19a, and 20 which are provided after the pump 13 in the slurry line 14 and in the filtrate withdrawal line 15. The reversing valves 17 to 20 make it possible to utilize the pump 13, parts of the slurry line 14, and parts of the filtrate withdrawal line 15 as a wash device.

The plate filter 11 includes a filter unit 21 which comprises plate-like filter elements which are disposed on a shaft in a stack-like manner under the interposition of sealing means, and which are pressed against a shaft abutment by means of an adjustable pressure device 22 of known design. The shaft of the filter unit 21, via a bolted joint, comprises a lower shaft part 23 and an upper shaft 24.

The shaft parts 23 and 24 are respectively provided with an axial passage, which for the lower shaft part 23 is in the form of a through-bore, and for the upper shaft part 24 is in the form of a blind-hole bore having side openings which lead to the filter plates. Adjoining the blind-hole bore, the upper shaft part 24 has a solid extension which is surrounded by a driven sleeve 25 which, by means of an adjusting spring and an inner groove, is secured to the solid extension in such a way that it cannot rotate relative thereto yet can be axially removed therefrom. The lower end of the driven sleeve 25 is in the form of an abutment for the pressure device 22. The upper end of the sleeve 25 is provided with an abutment surface for an adjusting nut which cooperates with a thread on the free end of the solid extension, and which permits the sealing state of the filter unit 21 to be externally adjusted. The driven sleeve 25 is sealingly mounted in a support and connecting head 27 in such a way as to be rotatably and axially supported; the support and connecting head 27 is disposed on the top wall 26 of the filter housing. On its free end, below the abutment surface for the adjusting nut, the driven sleeve 25 is provided with a driven pulley 28 for a toothed belt. The driven sleeve 25, the support and connecting head 27, and the pulley 28 form those parts of the driving arrangement which are disposed on the top wall 26 for rotating the shaft 23, 24 of the filter unit 21.

The housing, which surrounds the filter unit 21, comprises a hood or tank-like housing part and a housing bottom. The hood or tank-like housing part is formed by the top wall 26 and a peripheral wall 31, and the housing bottom is formed from a bottom ring 29 and a bottom plate 30. The bottom ring 29 and the bottom plate 30 are in the form of a type of disk valve, with the seat of the valve disk being formed on the bottom ring 29, while the bottom plate, as a valve disk, is adapted to be raised and lowered. The upper tank or hood-like housing part is secured on the bottom ring 29 in such a way that it can be raised therefrom.

The lower shaft part 23 of the shaft of the filter unit 21 is vertical and is guided through the center of the bottom plate 30, which is sealingly and axially displaceably mounted on this shaft part 23. Fixed below the bottom plate 30 is a support and connecting piece 32 into which the through-bore of the lower shaft part 23 opens out, and to which the filtrate withdrawal line 15 is connected.

Figure 2:
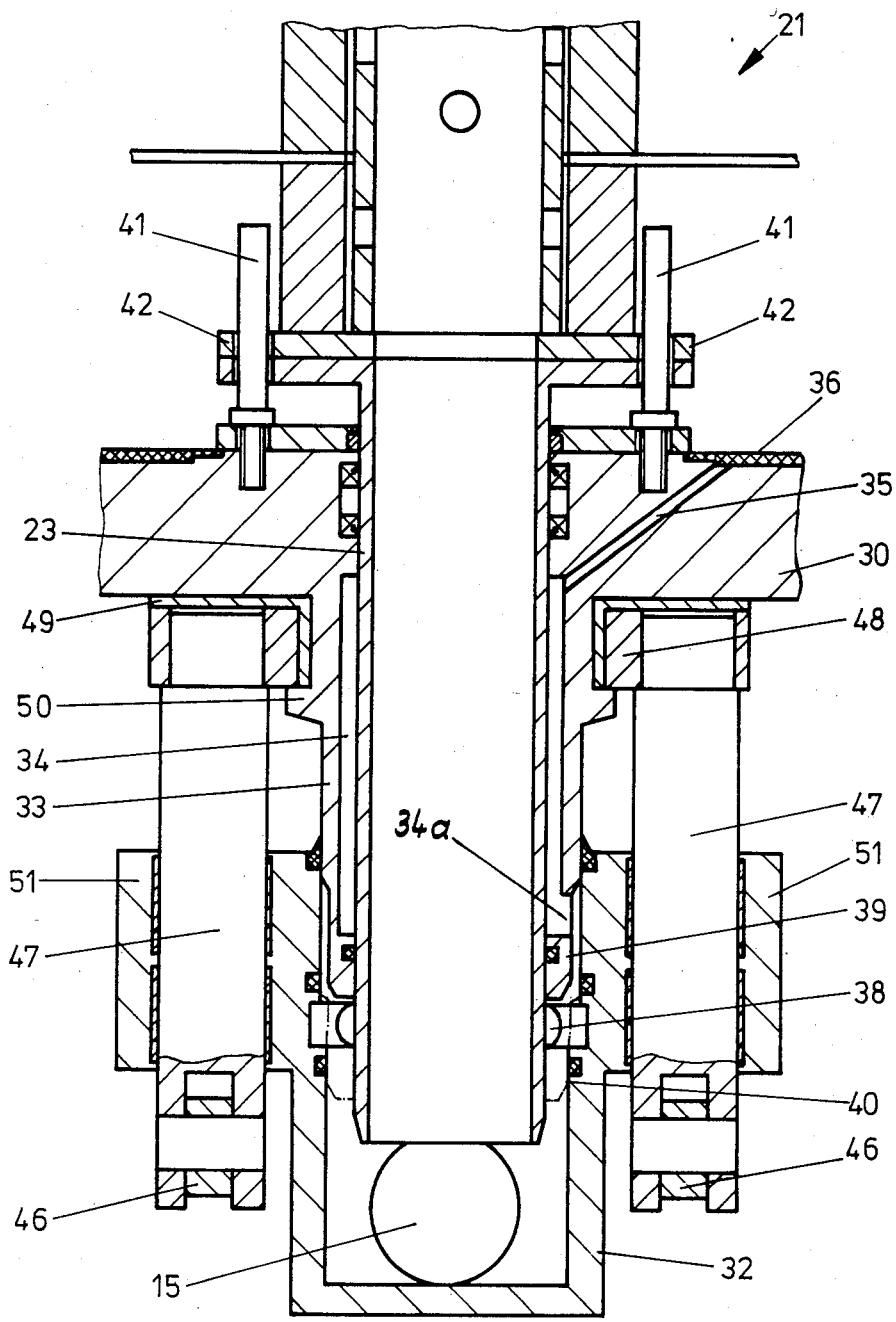
FIG. 2 is an enlarged view of the parts disposed below the bottom plate for lower support and sealing of the shaft of the filter unit, and also shows the control and actuation apparatus for raising and lowering the bottom plate; this view is taken along the line I—I in FIG. 1, but with the bottom plate raised.

As can be seen in particular in FIG. 2, the bottom plate 30 is provided with a lower extension 33 which, together with the plate 30, forms an axially displaceable sliding guide on the lower shaft part 23 and, in its central region, an annular channel 34 which surrounds the lower shaft part 23. By means of inclined channels 35, this annular channel 34 communicates with a residual filtration element 36 on the upper side of the bottom plate 30. As shown in FIG. 1, an additional line 38, which can be closed off with the valve 37, is provided on the side of the support and connecting piece 32; when view in the direction of filtrate withdrawal, the line 36 empties into the filtrate withdrawal line 15 after the reversing valve 20. As shown by a dot-dash line in FIG. 2, in the lowered state the zigzagged tapered end 39 of the lower extension 33 of the bottom plate 30 extends into an annular seat 40 in the support and connecting piece 32, so that in this position, via a bore 34a which leads off from the lower termination of the annular channel 34, the annular channel 34 only communicates with the line 38, but not, due to the cooperation of the parts 39 and 40, with the connection of the filtrate withdrawal line 15. However, when the bottom plate 30 is raised as shown in FIG. 2, and the cooperation between the parts 39 and 40 is eliminated, an annular gap is produced between the seat 40 and the outer periphery of the lower shaft part 23. This annular gap forms a communication via the bore 34a from the annular channel 34 to the connection of the filtrate withdrawal line 15. The zigzag tapered end 39 of the lower extension 33, and the seat 40, thus form a reversing valve with which, when the bottom plate 30 is raised and the filtrate withdrawal line 15 is used as a washing line, washing of the residual filtration element 36 can also be effected via the open annular gap, the bore 34a, the annular channel 34, and the channels 35.

In order to produce an effective rotation coupling between the bottom plate 30 and the filter unit 21, a number of vertically extending coupling through pins 41 are disposed on the upper side of the plate 30; the pins 41 extend into corresponding bores of a driving disk 42 which is formed from the flanges of the bolt connection of the two shaft parts 23, 24.

A control mechanism 43 is provided for raising and lowering the bottom plate 30. This mechanism 43 includes a screw drive 44 which consists of a screw spindle, a drive motor 45 which is self-locking in any given position, and an angle lever 46 which converts the horizontal displacement of the screw spindle into a vertical movement. The control mechanism 43 also comprises two vertical opposed guide bars 47, and a support and bearing ring 48 which is connected to the upper ends of the guide bars 47. The ring 48 is mounted on the outer periphery of the extension 33 by means of a flange bushing 49, and through the intervention of the flange thereof rests against the underside of the bottom plate 30; a catch ring 50 formed on the lower extension 33 extends beyond the ring 48. As shown in FIG. 2, the guide bars 47 are guided in extensions 51 on the sides of the support and connecting piece 32 in such a way that they can be moved in the vertical direction. Since the guide bars 47 are fixedly connected with the support and bearing ring 48, pressure or tension exerted upon the guide bars 47 is transmitted to the bottom plate 30 by means of the screw drive 44, which is pivotably connected to the guide bars 47 via the angle lever 46. For this purpose, the bottom end of each of the guide bars 47 is provided with a slot and a bolt which extends transverse thereto, as can be seen in FIG. 2; the angle lever 46, which is pivotably disposed on the support and connecting piece 32 about a point of rotation, is provided with a lower fork-like arm which enters into the respective slots of the guide bars and is pivotably connected to the bolts. The essentially horizontally directed screw drive 44 is pivotably connected to the other arm of the angle lever 46, which arm is provided with a rotatably disposed nut. In order to permit manual operation, the screw spindle 44, the front part of which is arranged like apendulum, can additionally be provided at its free end with a square end to which can be applied a hand crank. The support and connecting piece 32, and the pendulum emplacement for the screw spindle, are secured to the bottom ring of the filter housing. As a result of the self-locking action of the screw drive 44, the bottom plate 30 is held firmly in place in every adjusted raised or lowered position. It is in particular possible by means of the screw drive 44 to transmit applied tension to the bottom plate 30, so that in the lowermost position, the bottom plate 30 is pressed with intended pressure against the seat formed on the bottom ring 29.

As shown in FIG. 1, the same drive mechanism 54 is provided for the agitator 53 of the dosing device 12, and for rotating the shaft 23, 24 of the filter unit 21. The mechanism 54 comprises a drive motor 55, the speed of which can be controlled and the direction of drive rotation of which can be reversed, and a gearing 56, which is expediently infinitely variable. A miter-wheel gearing 57 is connected to the output of the gearing 56; the underside of the gearing 57 is provided with a connector for the agitator 53, which essentially comprises a stirring paddle. On the side opposite the connector, a shaft end emerges upwardly out of the gearing 57. A freewheel or slip coupling 59 is mounted on this shaft end, which is aligned with the shaft 23, 24 of the filter unit 21. A driving pulley 58 for a toothed belt is connected with the freewheeling coupling part thereof. The freewheel coupling 59 is an automatically shiftable coupling which for agitator operation during normal direction of rotation of the drive motor 55 is designed for freewheeling, and when the direction of rotation of the drive motor 55 is reversed, is designed for locking in and rotating the driving pulley 58. From this it can be seen that the drive mechanism for the shaft 23, 24 of the filter unit 21 is formed by the parts disposed on the top wall 26, namely the driven sleeve 25, the support and connecting head 27, and the driven pulley 28, by the freewheel coupling 59 with the driving pulley 58, and by the drive mechanism 54 of the agitator 53, in conjunction with a toothed belt as the transmitting means. The drive mechanism for the shaft 23, 24 thus represents a tension means gearing in the form of a toothed belt drive.

In order to protect those parts arranged below the filter housing for support and guidance of the bottom plate 30, and those parts of the control mechanism 43 for the bottom plate 30, from becoming dirty or clogged as a result of emerging filter cakes, wash liquid, etc., a discharge conduit 60 is formed on the underside of the bottom ring 29. The discharge conduit 60 extends in an annular manner over the outlet of the plate or disk valve formed by the bottom plate 30 and the valve seat of the bottom ring 29. The discharge conduit 60 comprises two coaxial, essentially cylindrical guide walls 61 and 62, with the discharge aperture which is obtained therebetween. Tubular connecting means in this discharge aperture between the two guide walls 61 and 62 serve to brace the latter relative to one another, as well as to protect the screw spindle and the filtrate withdrawal lines and let them pass through. Furthermore, on the underside of the bottom plate 30, in the region of the inner guide wall 62, there is disposed a telescopic discharge guide plate 63 which extends into the discharge conduit 60 and, even when the bottom plate 30 is raised, closes off the discharge conduit 60 relative to the support and connecting piece 32 which is disposed below the bottom plate 30, as well as relative to the control mechanism 43 of the bottom plate 30.

If after a certain period of filtration the filter unit 21 of the plate filter 11 has to be cleaned, first not only is the supply of slurry via the slurry line 14 interrupted by shutting off the pump 13 and closing the reversing valve 18, but also the dosing of filtering aids into the slurry line, which is undertaken in the customary manner, is interrupted. Furthermore, a gas inlet 64 provided on the slurry line 14 above the reversing valve 18 is opened; compressed gas is supplied via this gas inlet 64 into the slurry line 14. As soon as the liquid level in the plate filter 11, under the influence of the compressed gas, has dropped to the level of the lower filter plate (in the most favorable situation), the reversing valve 20 is closed and the valve 37 is opened, while the supply of compressed gas is maintained for undertaking filtration of the slurry residue. The residual filtration is now effected via the residual filtration element 36 which is provided in the bottom plate 30, whereafter the filtrate flows off via the filtrate withdrawal line 15.

Drying of the filter cake which is present on the filter plates and on the residual filtration element 36 follows the residual filtration, with the reversing valve 19a closed and the reversing valve 20 again open, as well as with a gas outlet 65, which is attached to the filtrate withdrawal line 15, having been opened. For this purpose, air is introduced via the gas inlet 65 into the slurry line 14 and into the plate filter 11. After the air has passed through the filter cakes, it exits via the gas outlet 65 into the atmosphere.

After the drying has been carried out, and the gas inlet 64 has been closed, centrifuging and removal of the filter cakes is effected. For this purpose, by actuating the control mechanism 43 by switching on the drive motor 45, the bottom plate 30 is first raised in order to produce an annular gap between the bottom plate 30 and the valve seat of the bottom ring 29. Via the output of the disk valve, the annular gap provides communication between the interior of the plate filter 11 and the discharge conduit 60.

After the drive mechanism 54 of the agitator 53 has been reversed or switched from the normal direction of rotation for operation of the agitator into the reverse direction of rotation, the shaft 23, 24, and hence the filter unit 21 together with the bottom plate 30 which is connected via the rotation coupling, are rotated by means of the drive mechanism, with the freewheel coupling 59 being effective. This leads to centrifuging of the filter cakes of the filter plates and of the residual filtration element 36, as well as to removal of the cakes via the outlet of the disk valve and the discharge conduit 60 into a receptacle disposed therebelow. In the event that the speed for the agitator 53 needs to be less or greater, the rotation can, by means of the speed-regulatable drive motor 55 or the infinitely variable gearing, be respectively adjusted to the centrifugal force required for centrifuging the filter cake.

As soon as the filter cakes are discharged and removed from the discharge region, and while the bottom plate 30 is still raised, the filter unit 21 is still rotating, and the reversing valve 17 is opened, wash liquid is withdrawn from the tank of the dosing device 12 by means of the pump 13 via the line 16 and the slurry line 14, and wash liquid is supplied via the filtrate withdrawal line 15 with the reversing valves 19, 20 being opened and the gas outlet 65 and the reversing valves 18, 19a being closed. A portion of this wash liquid passes via the valve 37, the bore 34a, the annular channel 34, and the channels 35 to the residual filtration element 36 and exits the latter into the filter housing. After washing has been effected, with the wash liquid, just like the filter cakes, passing via the outlet of the disk valve formed by raising the bottom plate 30 into the discharge conduit 60, and thereafter into the atmosphere, the drive motor 55 is turned off or switched into the normal direction of rotation. By means of the control mechanism 43 by switching the drive motor 45 into the appropriate direction of rotation, the bottom plate 30 is then lowered and is drawn with the desired bearing pressure against the valve seat formed on the bottom ring 29. When the desired contact pressure has been achieved, the drive motor 45 is turned off and the cake filtration process, which begins with preliminary caking can then again be initiated in the customary manner.

The present invention is, of course, in no way restricted to the specific disclosure of the specification and drawings, but also encompasses any modifications within the scope of the appended claims.

What we claim is:

1. A cake filtration apparatus which includes: a plate filter, which includes a filter unit which is formed from a stack of filter plates disposed on a shaft and is rotatable about its vertically disposed central axis for contrifuging filter cake; a filtering aid-dosing device which includes an agitator and a drive mechanism therefor; and pumps, lines, and valves for supplying said plate filter with slurry which is to be filtered, and for withdrawing filtrate therefrom; said apparatus further comprises:

a housing in which said filter unit is rotatably disposed, and which includes connections for supply of slurry to, and withdrawal of filtrate from, said plate filter; said housing includes a bottom and, secured thereto, a hood-like part which includes a peripheral wall and a top wall; said shaft of said filter unit is sealingly yet rotatably mounted in said housing in the vicinity of said bottom thereof; said bottom includes, in the manner of a disk valve, a fixed bottom ring having a valve seat, and a bottom plate which is disposed within said bottom ring and is adapted to be raised from a lower closed position, in which it is sealed relative to said bottom ring on said valve seat thereof; into an open position for removal of centrifuged filter cake, and which is adapted to again be lowered;

a drive mechanism for rotating said filter unit, with those parts of said last-mentioned drive mechanism intended for axial support and for rotation of said shaft of said filter unit being disposed on said top wall of said housing;

an automatically shiftable coupling, with said last-mentioned drive mechanism parts which are disposed on said top wall being driven by said drive mechanism for said agitator via said coupling; and a control mechanism for effecting said opening and closing of said bottom plate by raising and lowering same independent of said filter unit.

2. A cake filtration apparatus according to claim 1, in which said bottom plate includes a downwardly directed, hollow-shaft-like extension by means of which said bottom plate is sealingly yet axially displaceably guided on said shaft of said filter unit; and which includes a stationary, sleevelike support and connecting piece in which said extension of said bottom plate is sealingly, rotatably, and axially displaceably guided.

3. A cake filtration apparatus according to claim 2, in which said shaft of said filter unit is provided with a driving disk; and in which said bottom plate is provided with coupling through pins which are guided in said driving disk; said pins and said disk provide an operative rotation coupling between said bottom plate and said filter unit.

4. A cake filtration apparatus according to claim 2, which includes: a residual filtration element on the top side of said bottom plate; channels in said bottom plate, said extension of said bottom plate, and said support and connecting piece for receiving filtrate from said residual filtration element; a filtrate withdrawal line for receiving filtrate from said plate filter; a line which communicates with said channel in said support and connecting piece and leads to said filtrate withdrawal line; and a shutoff valve disposed in said former line.

5. A cake filtration apparatus according to claim 4, in which said filtrate withdrawal line communicates with said channels of said extension of said bottom plate; and in which said support and connecting piece, and said extension of said bottom plate, have parts which cooperate to form a back wash valve interposed between said communication of said filtrate withdrawal line and said channels, with said valve being closed when said bottom plate is lowered, and open when said bottom plate is raised.

6. A cake filtration apparatus according to claim 2, in which said control mechanism for raising and lowering said bottom plate includes a screw drive.

7. A cake filtration apparatus according to claim 6, in which said screw drive is provided with a drive motor which is self-locking in any given position.

8. A cake filtration apparatus according to claim 2, in which said support and connecting piece, which provides for lower support and sealing of said shaft of said filter unit, and said control mechanism for raising and lowering said bottom plate, are both disposed on said bottom ring of said housing.

9. A cake filtration apparatus according to claim 8, in which said hood-like part of said housing is secured to said bottom ring thereof in such a way that it can be removed therefrom.

10. A cake filtration apparatus according to claim 9, in which, for centrifuged filter cake, said bottom ring of said housing is provided with a discharge conduit which extends all around, and is formed by two coaxial, essentially cylindrical guide walls, between which a discharge gap is formed.

11. A cake filtration apparatus according to claim 10, which includes, on the underside of said bottom plate, a discharge guide plate which extends telescopically into said discharge conduit.

12. A cake filtration apparatus according to claim 8, in which said support and connecting piece is provided with extensions; in which said control mechanism includes guide bars which are vertically displaceably disposed in said lastmentioned extensions; and which includes a support and bearing ring which is supported against the underside of said bottom plate, on said guide bars, and on said extension of said bottom plate.

13. A cake filtration apparatus according to claim 12, in which said control mechanism includes a screw drive having a screw spindle, and an angle lever, with said screw spindle being disposed essentially horizontally, and being pivotably connected via said angle lever to said guide bars.

14. A cake filtration apparatus according to claim 1, in which the driving direction of rotation of said drive mechanism of said agitator is reversible; and in which said automatically shiftable coupling, which is disposed ahead of said drive mechanism parts which are intended for rotation of said shaft of said filter unit, is a freewheel coupling which for agitator operation in the normal direction of rotation is designed for freewheeling, and for rotation of said filter unit in the opposite direction is designed for driving.

15. A cake filtration apparatus according to claim 14, in which said drive mechanism for said agitator is at least one of a speed-regulatable drive motor and a speed-adjustable gearing.

16. A cake filtration apparatus according to claim 15, in which said speed-adjustable gearing is an infinitely variable gearing.

17. A cake filtration apparatus according to claim 14, which includes a transmission means, and in which said drive mechanism parts which are disposed on said top wall of said housing, said drive mechanism, including said freewheel coupling, of said agitator, together with said transmission means, form a pulley drive for rotating said filter unit.

18. A cake filtration apparatus according to claim 17, in which said pulley drive is a toothed belt drive; in which said drive mechanism of said agitator is provided with a shaft end which is aligned with said shaft of said filter unit, and on which said freewheel coupling is mounted; said freewheel coupling has a freewheeling coupling part with which is connected a driving toothed belt pulley; said drive mechanism parts which are disposed on said top wall of said housing comprise a driven toothed belt pulley, a drive sleeve, and a support and connecting head; said driven toothed belt pulley is fixedly connected with said drive sleeve, which fixedly holds said shaft of said filter unit, and is sealingly, rotatably, axially supported in said support and connecting head, which is disposed on said top wall of said housing.

19. A cake filtration apparatus according to claim 18, in which said drive sleeve has a lower end in the form of an abutment for an adjustable pressure device which acts axially upon the stack of filter plates which forms said filter unit; and in which said drive sleeve has an upper end in the form of an abutment for an adjusting nut which cooperates with a thread disposed on an upper portion of said shaft of said filter unit, which shaft is guided through said drive sleeve.

* * * * *